United States Patent
Andrew et al.

(10) Patent No.: US 6,643,084 B1
(45) Date of Patent: Nov. 4, 2003

(54) ADAPTIVE OFF-TRACK RECOVERY

(75) Inventors: Au Hoan Andrew, Palo Alto, CA (US);
James M. Dervin, Rochester, MN (US); Theofilos G. Fkiaras, San Jose, CA (US); Xiaoyu Sui, Fremont, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 09/553,887

(22) Filed: Apr. 20, 2000

(51) Int. Cl.[7] ................................. G11B 5/09
(52) U.S. Cl. ................. 360/53; 360/77.02; 360/31
(58) Field of Search ............... 360/53, 31, 58, 360/73.03, 77.02, 77.04, 77.06, 78.01

(56) References Cited

U.S. PATENT DOCUMENTS

| | | | |
|---|---|---|---|
| 3,860,958 A | 1/1975 | Hanson | 360/57 |
| 4,516,165 A | 5/1985 | Cunningham et al. | 360/53 |
| 5,353,170 A | 10/1994 | Fung et al. | 360/53 |
| 5,379,162 A | 1/1995 | Cunningham et al. | 360/53 |
| 5,408,367 A | 4/1995 | Emo | 360/53 |
| 5,461,517 A | 10/1995 | Suda et al. | 360/53 |
| 5,721,816 A | 2/1998 | Kusbel et al. | 395/182.13 |
| 5,790,333 A * | 8/1998 | Kimura et al. | 360/60 |
| 6,178,054 B1 * | 1/2001 | Wakefield | 360/31 |

FOREIGN PATENT DOCUMENTS

| | | |
|---|---|---|
| JP | 0282783 | 11/1989 |
| JP | 402297783 A | 12/1990 |
| JP | 404219607 A | 8/1992 |
| JP | 406236504 A | 8/1994 |
| JP | 408293174 A | 11/1996 |

OTHER PUBLICATIONS

"Magnetic Head Test Optimized For Correlation to Performance," IBM Technical Disclosure Bulletin, vol. 29 No. 11 Apr. 1987, pp. 4794–4796.
"Data Re–Write Procedure For Magnetic Recording Device," IBM Technical Disclosure Bulletin, vol. 34, No. 6, Nov. 1991, pp. 126–127.
"Adaptive Magnetic Write Width Control," IBM Technical Disclosure Bulletin, vol. 35 No. 6 Nov. 1992, pp. 86–88.

\* cited by examiner

*Primary Examiner*—David Hudspeth
*Assistant Examiner*—Varsha A Kapadia
(74) *Attorney, Agent, or Firm*—Abdy Raissinia; Bracewell & Patterson, L.L.P.

(57) ABSTRACT

A method and system for adaptively limiting an off-track recovery displacement of a recording head during an off-track data recovery operation. A head disk assembly (HDA) includes an actuator that positions the recording head in accordance with an actuator control signal. First, an off-track recover displacement threshold is determined utilizing an off-track data field which overlays an on-track data field. The recording head is displaced with respect to the track center until the on-track data field is read. The relative displacement required to retrieve the on-track data is utilized as the threshold. In response to a failed read attempt, a data recovery procedure commences whereby the recording head is incrementally displaced from the track center while attempting to recover the data. During the DRP, the predetermined off-track recovery threshold is utilized to limit the head displacement such that the input/output (I/O) data integrity of the off-track recovery is ensured.

16 Claims, 5 Drawing Sheets

ADAPTIVE OFF-TRACK RECOVERY

BACKGROUND OF THE INVENTION

1. Technical Field

The present invention relates in general to an improved digital storage system and in particular to a method and system for improving the integrity of read/write operations within a head disk assembly (HDA). More particularly, the present invention relates to a method for providing off-track recovery boundaries for magnetoresistive (MR) and giant magnetoresistive (GMR) heads. Still more particularly, the present invention relates to a method for predetermining an off-track recovery boundary for an HDA that may be utilized following a failed read attempt as the limiting parameter during remedial off-track recovery attempts, thus ensuring the integrity of the read operation.

2. Description of the Related Art

Generally, a digital data storage system consists of one or more storage devices that store data on storage media such as magnetic or optical data storage disks. In magnetic disk storage systems, an HDA includes one or more hard disk drives (HDDs) and a hard disk drive (HDD) controller to manage local operations concerning the disks. HDDs are rigid platters, typically made of aluminum alloy or a mixture of glass and ceramic, covered with a magnetic coating. Typically, two or three platters are stacked vertically on a common spindle that is turned by a disk drive motor at speeds often exceeding ten thousand revolutions per minute (rpm).

The only other moving part within a typical HDA is a head positioning system. The head positioning system includes a recording head associated with each side of each platter. In most modern drives, the recording heads are mounted at the end of small ceramic sliders which "fly" just above or below the platter's surface, supported by an air bearing surface that are self-pressurized by the airflows generated by the rapidly spinning disk. Each head is connected to a flexible actuator arm apparatus which supports the entire head flying unit. More than one of such arms may be utilized together to form a single armature unit.

Each head scans the hard disk platter surface during a "read" or "write" operation. The head/arm assembly is moved utilizing an actuator which is often a Voice Coil Actuator (VCA) driven by a servo voice coil motor (VCM). The stator of the VCM is mounted to a base plate or casting on which is mounted a spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the head nears the desired track, a reverse polarity signal is applied to the actuator, causing the signal to act as a brake, and ideally causing the recording head to stop directly over the desired track.

HDAs continue to be the primary, high performance storage technology in terms of bit rate transfer. The success of HDAs in this respect, originates from an ever increasing demand for storage capacity coupled with a consistent reduction in price per stored data unit (mega- or giga-bytes). Areal density (expressed as billions of bits per square inch of disk surface area) is the product of linear density (bits of data per inch of track) multiplied by track density (tracks per inch or "TPI"). New technologies aimed at improving recording head efficiency are required to accommodate higher areal densities. Among the most significant of such advances have been the development of the magnetoresistive (MR) head, the extended magnetoresistive (MRx) head, and the giant magnetoresistive (GMR) head technologies.

In addition to improved head design, modern HDA throughput and storage capacity have been substantially enhanced by improvement in actuator design which has resulted in increased head placement precision and speed. The more precisely the actuator can place the recording head, the greater the amount of data that can be packed onto a given area of disk surface (often referred to as areal density). To meet greater performance demands, the bandwidth of the HDA system must increase (its response time to head-position changes must decrease). This demand for increased servo bandwidth has resulted in ever faster and more compact HDA assemblies. As utilized herein, "off-track recovery" refers to a data recovery attempt within a HDA in response to a failed read attempt. During an off-track recovery procedure, the actuator re-positions the head from its original read position (ostensibly the track center) on the assumption that the desired data field is located somewhat off-center with respect to the track center.

During operation of a HDA unit, it is important that the head remain positioned over the center of the track on which it is writing or reading data. This has become increasingly difficult as the tracks have become smaller in width and are spaced closer together in order to increase the overall data density of the disk. The head may be off-center due to variations in thermal expansion of the different parts of the HDA, head positioning actuator inaccuracies, imperfect axial rotation of the spindle motor, or the like.

One solution to the head mis-positioning is to move the head in incremental steps across the track while attempting to determine the actual track center. This method is described in further detail with reference to U.S. Pat. No. 4,485,418 issued Nov. 27, 1984; IBM Technical Disclosure Bulletin, Vol. 35, No. 4B, p.303, September 1992; IBM Technical Disclosure Bulletin, Vol. 29, No. 2, p.586, July 1986.

Incomplete erasure of a previously recorded data track presents the potential for reading old data. When a new data field is written on a track, it overwrites the previous old data field. However, if the head is not properly centered on the track during the write operation, then a slice of the old data may remain at the edge of the new data field. This may cause an undetected false data read error when a read is subsequently attempted for the newly written data.

One approach to solving this problem has been to provide erase bands between consecutive data tracks. The head may have additional separate erase elements on either side of the write element in order to assure that the edge of each newly written field does not contain any data. Alternatively, the write element may be utilized to create the erase bands on either side of a newly written data field. Examples of this include the following references cited in U.S. Pat. No. 5,353,170 issued Oct. 4, 1994: U.S. Pat. No. 4,858,048 issued Aug. 15, 1989 and U.S. Pat. No. 4,771,346 issued Sep. 13, 1988.

MR heads (GMR and MRx included) generally contain separate read and write elements, with the write element being wider than the read element. The wide write element is a transducer element that is optimized for writing, while the narrower read MR element is optimized for reading. This MR recording head design permits smaller and more closely spaced data tracks to be written to and read from, thus increasing overall storage capacity of the HDA.

The relative narrowness of the read head with respect to the write head presents a problem related to incomplete data erasure. Because the read head is substantially narrower than the write head, an incompletely erased old data track may be mistakenly read as new data. The likelihood of reading an old data field in such a manner is further increased by the need to incrementally seek the track to on which the data is located. This track "hunting" only increases the chance that an old unerased data field at the edge of the track may be mistakenly read. The utility of erase bands on either side of the data track is limited by the close spacing between tracks. The erase bands must be sufficiently narrow such that the edge of a data track is erased without also erasing a portion of a neighboring track.

It would therefore be desirable to provide an improved data recovery method and system in which provides a safeguard against inadvertently reading old data within a HDA, such that I/O data reliability during data read operations can be ensured.

SUMMARY OF THE INVENTION

The above and other objects are achieved as is now described. A method and system are disclosed for adaptively limiting an off-track recovery displacement of a recording head during an off-track data recovery operation. A head disk assembly includes an actuator that positions the recording head in accordance with an actuator control signal. First, an off-track recover displacement threshold is determined utilizing an off-track data field which overlays an on-track data field, wherein the on-track data field has a distinctive data pattern with respect to the off-track data field. The recording head is displaced with respect to the track center until the on-track data field is read. The relative displacement required to retrieve the on-track data is utilized as the threshold. This threshold is stored in a reserved dedicated storage location on the disk from which it may be transferred to random access memory (RAM). In response to a failed read attempt, a data recovery procedure (DRP) commences whereby the recording head is incrementally displaced from the track center while attempting to recover the data. During the DRP, the predetermined off-track recovery threshold is utilized to limit the actuator displacement such that the input/output data integrity of the off-track recovery is ensured.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF A PREFERRED EMBODIMENT

As the track density of servo-drive hard disk drives increases, a high servo bandwidth is required to improve on-track drive performance as measured by Track Misregistration (TMR), Position Error Signal (PES), etc. Mechanical resonance experienced by the head-positioning assembly, mechanical deformation caused by thermal variations, and externally induced mechanical shock are some of the dominant factors that limit the on-track reliability of a voice coil motor driven head disk assembly (HDA). For these or other reasons data may be written off-track.

Figure 1:
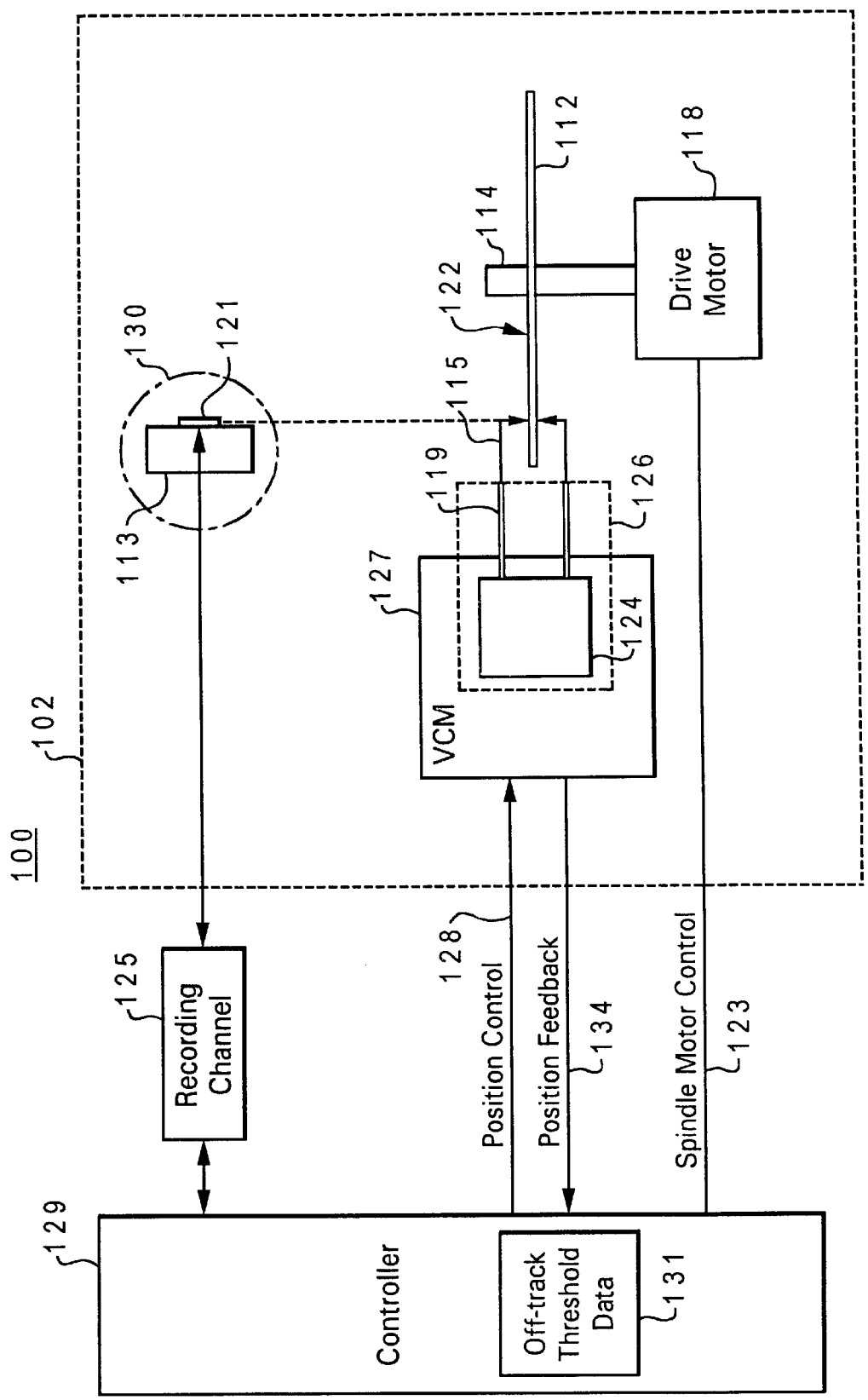
FIG. 1 illustrates a block diagram of a hard disk drive system having head disk assembly in which adaptive off-track recovery is employed.

Referring now to the figures wherein like reference numerals refer to like and corresponding parts throughout, and in particular with reference to FIG. 1 there is illustrated a block diagram of a hard disk drive(HDD) system 100 having a HDA 102 in which adaptive off-track recovery is employed. The invention described hereinbelow is useful with all electromechanical configurations of data storage disk drives or direct access storage devices (DASD). Included within such configurations in which the present invention may be practiced are multiple drive arrays such as a Redundant Array of Independent Disks (RAID) system. Also, it will be appreciated that the invention is also applicable to, and may be utilized by, other information storage systems, such as an optical data storage system.

HDD system 100 includes a head disk assembly (HDA) 102 that is electromechanically connected to a disk controller 129 via a recording channel 125, a head position control line 128, and a motor control line 123. At least one rotatable magnetic disk 112 is mounted on a spindle/hub 114 that is supported by a bearing within a disk drive motor 118 by which disk 112 is rotated. The magnetic recording media on each disk forms of an annular pattern of concentric data tracks (not shown) on disk 112. At least one head assembly 130 is positioned on the rotating disk 112 during normal read and write operations. Each head assembly 130 is comprised of a slider 113 that supports one or more magnetic recording heads 121. As disk 112 rotates, head assembly 130 is moved at a skewed angle in and out so that heads 121 may access different a portions of the disk surface 122 containing the data. Each head assembly 130 is attached to an actuator arm 119 by means of a suspension and head assembly 115. The suspension and head assembly 115 provides a slight spring force which biases slider 113 against the rotating disk surface 122. While disk 112 is at rest, slider 113 may either be parked on the stationary disk surface 122 or it may be parked on a cantilevered ramp off of disk surface 122 or it may be removed from disk surface 122 by a suitable cam mechanism.

Each actuator arm 119 is attached to a coil 124 which serves as an actuating means within voice coil motor (VCM) 127. Together, actuator arm 119 and coil 124 comprise a servo-voice coil actuator 126. VCM 127 is a closed-loop device which utilizes servo-voice coil actuator 126 to track and re-position recording heads 121 in accordance with real time feedback from head 130. It should be apparent that HDA 102 may contain a large number of disks and actuators, and each actuator may support a number of sliders.

The various components of HDD 100 include logic control circuits, storage means and a microprocessor. These components are controlled by signals generated by disk controller (read/write electronics) 129. In the embodiment depicted in FIG. 1, such control signals may include access control signals and internal clock signals. Disk controller 129 generates control signals to control various system operations such as motor control signals on line 123 and head position control signals on line 128. The control signals on line 128 provide the desired current profiles to optimally move and position a selected slider 113 to the desired data track on the associated disk 112. Read and write signals are communicated to and from recording heads 121 by means of recording channel 125, which includes conductor lines running along suspension and head assembly 115 and actuator arm 119. In this manner, disk controller 129 controls physical and logical access to HDA 102.

Controller 129 receives positional information from actuator 126 through a position feedback signal 134. Controller 129 combines real-time head positioning information from actuator 126 which predetermined off-track displacement threshold data within data storage device 131 to determine position control signal 128.

In a preferred embodiment of the present invention, off-track displacement threshold data 131 are obtained in a customized manufacturing process. In this manner, the maximum allowable off-track seeking displacement can be identified and recorded on a head-by-head basis. In one embodiment of the present invention, position control signal 128 effectively limits the movement of actuator 126 in accordance with the off-track displacement threshold which is anticipated within controller 129 in accordance with off-track displacement threshold data 131.

Figure 2:
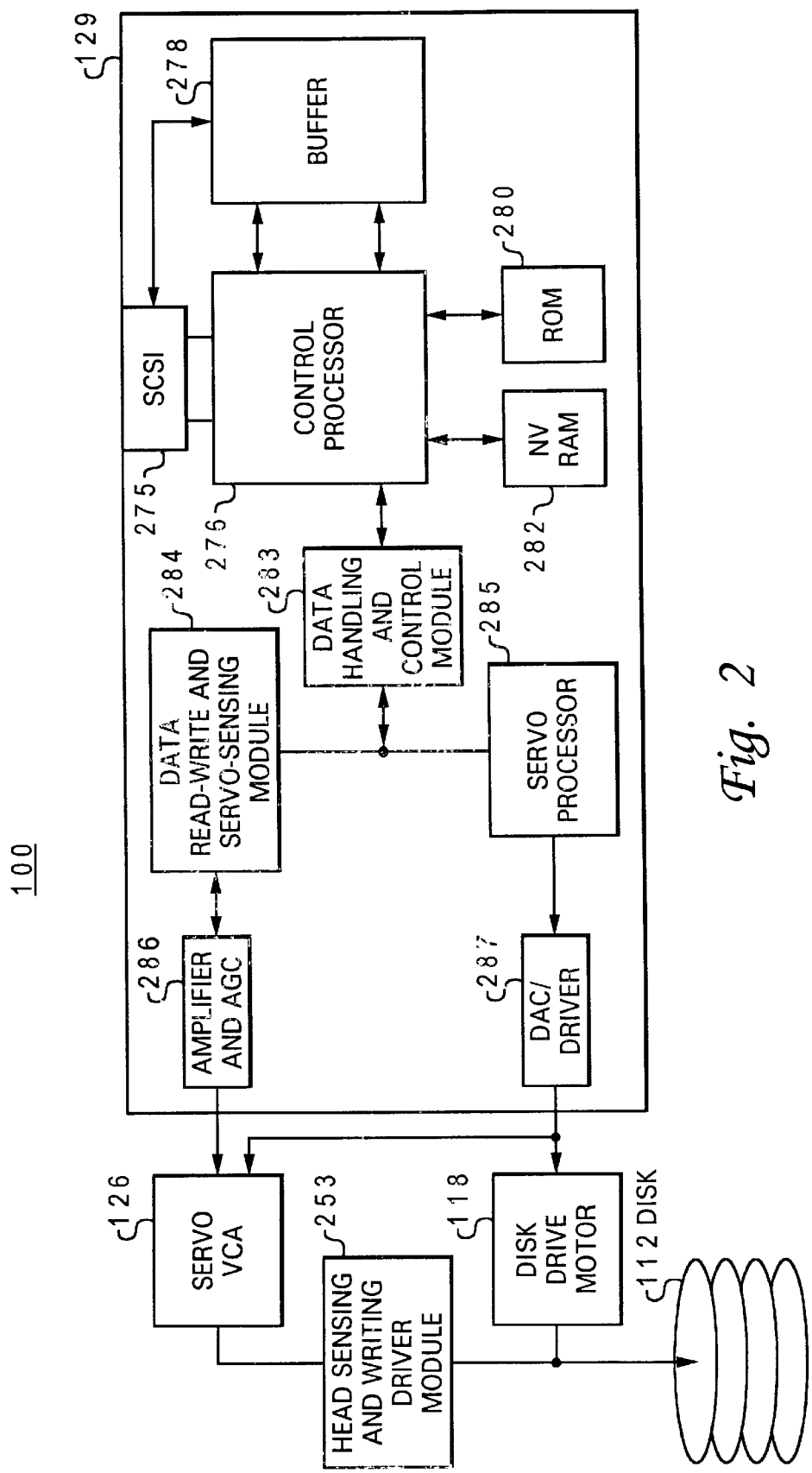
FIG. 2 depicts a block diagram of control circuitry within the hard disk drive of FIG. 1, for implementing off-track recovery in accordance with a preferred embodiment of the present invention.

Referring now to FIG. 2, there is illustrated a block diagram depicting internal and external functionality of a controller 129 within HDD system 100. Controller 129 may be located within a HDA controller, such as disk controller 129. Controller 129 communicates with a host processing unit, through an interface 275 such as a small computer system interface (SCSI). Controller 129 controls the storage of data to, and the recovery of data from, disks 112. Controller 129 comprises a control processor 276, a buffer 278, a data-handling and control module 283, a data read-write and servo-sensing module 284, a servo processor 285, an amplifier and automatic gain control (AGC) 286, and a digital-to-analog converter (DAC)/motor driver 287.

Control processor 276 may be initialized upon system power up, or it may have access to a small read-only memory (ROM) 280 and a small non-volatile RAM (NVRAM) 282 for program instructions. ROM 280 may hold a supervisor program executable on control processor 276 to carry out the process of the invention as further described with reference to FIG. 4. Control processor 276 may access buffer 278 for commands of execution. In addition, buffer 278 is also for temporarily holding data in transit between an external data processing system and disks 112.

After the physical location of head 130 on disks 112 has been determined by a servo-sensing circuit within data read-write and servo-sensing module 284, servo processor 285 delivers corresponding signals which are converted to analog form for motor control by DAC/motor-driver 287. Servo processor 285 is typically a high-speed digital signal processor. VCA 126, and head-sensing and writing driver module 253, together with disk drive motor 118, provide physical and logical access to disks 112. Data read and write operations are performed by head-sensing and writing driver module 253, processed by amplifier and AGC 286 and data read-write circuits within data read-write and servo-sensing module 284. Data conversion, ECC, and control-timing functions are provided by data handling and control module 283.

Figure 3:
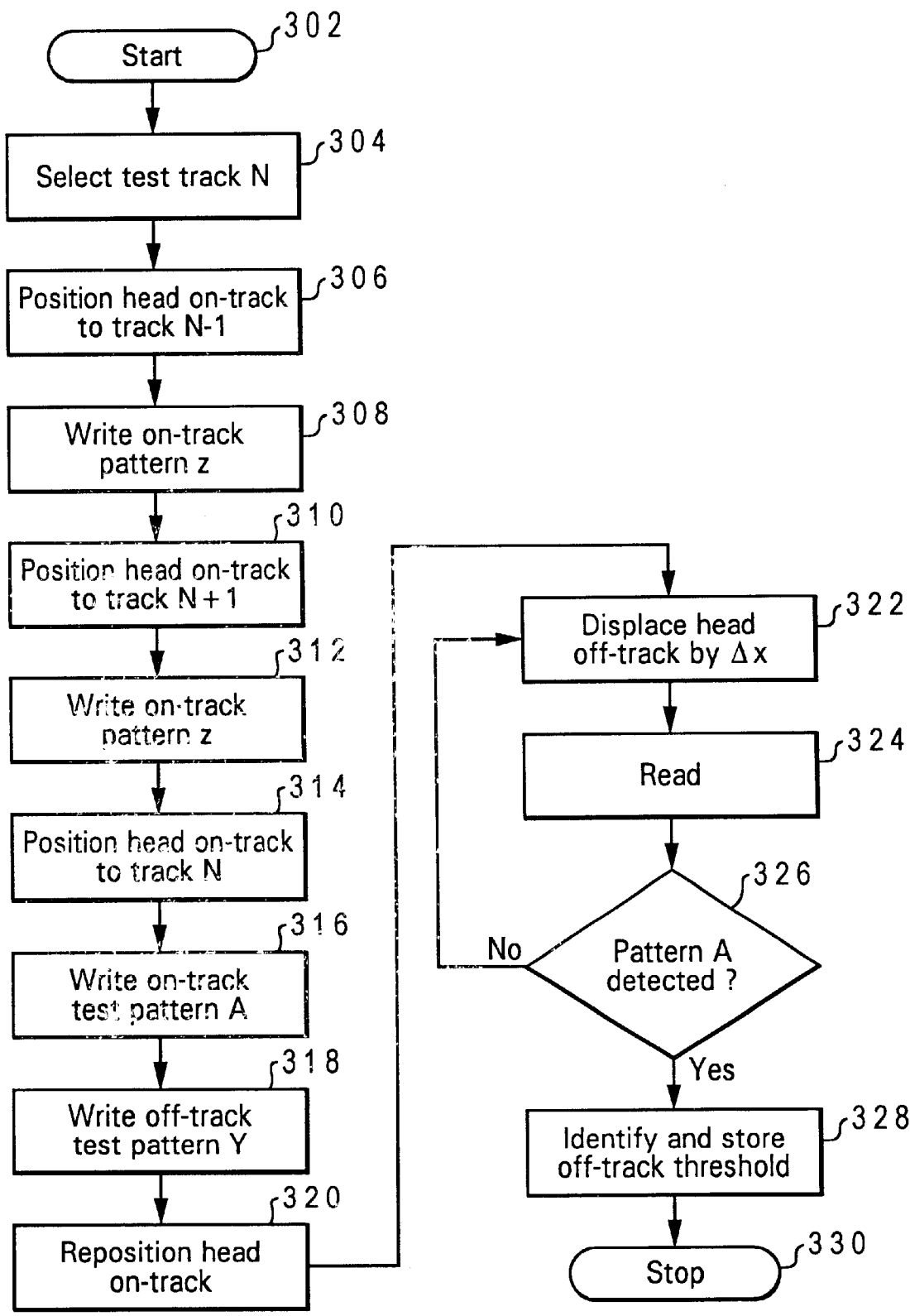
FIG. 3 is a high-level flow diagram illustrating steps performed for determining an off-track recovery displacement threshold in accordance with a preferred embodiment of the present invention.
Figure 5:
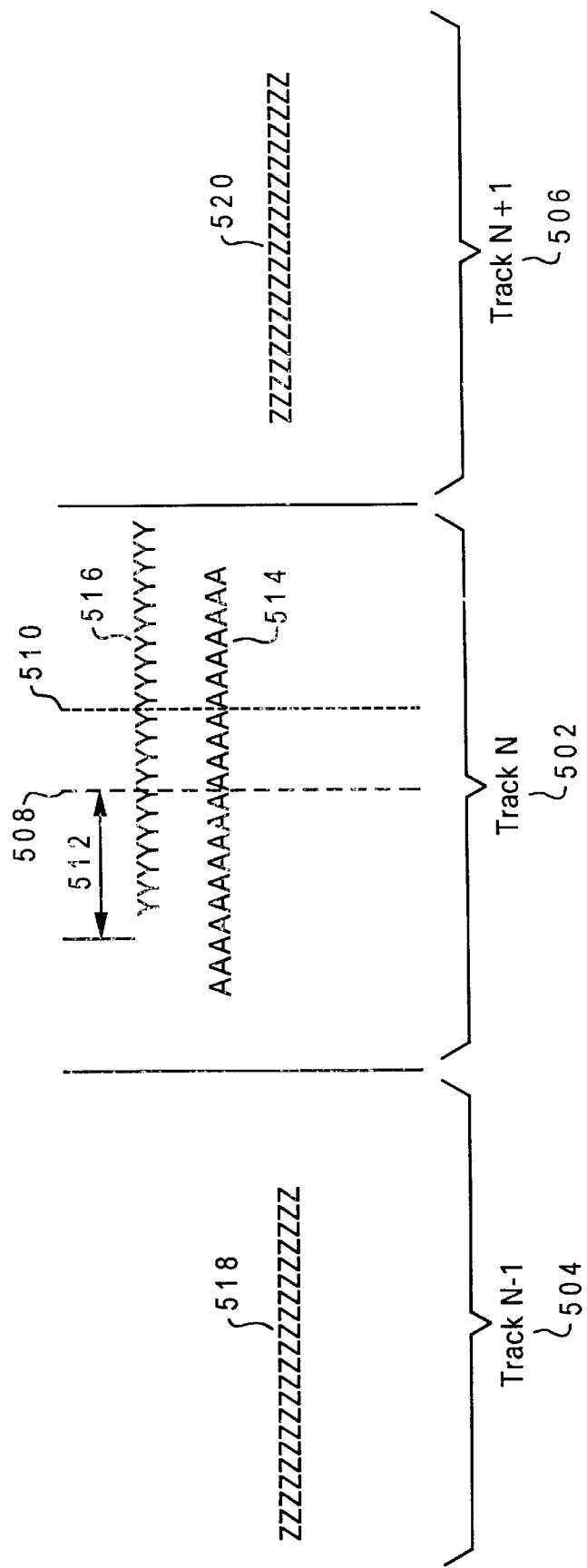
FIG. 5 illustrates on-track and off-track test data patterns as written and detected in accordance with the steps performed in determining off-track recovery displacement as shown in FIG. 3.

With reference now to FIG. 3, there is depicted a high-level flow diagram illustrating steps performed for determining an off-track recovery displacement threshold in accordance with one embodiment of the present invention. FIG. 5 illustrates on-track and off-track test data patterns as written and detected in accordance with the steps performed in determining off-track recovery displacement and is described herein with reference to the method steps of FIG. 3.

As noted with reference to FIG. 1, the off-track recovery displacement threshold is determined during the drive manufacturing process. The off-track threshold determination commences as depicted at steps 302 and 304 s with the selection of a test track N (track N 502 as shown in FIG. 5). Next, as shown at steps 306, 308, 310, and 312, a recording head is positioned on-track to the two nearest tracks, N−1 504 and N+1 506, where Z-patterns 518 and 520 respectively are written. A recording head being placed on-track with reference to track N 502 means that the head is positioned such that it is centered with respect to track N 502 at centerline 508.

After both Z-patterns have been installed as inner and outer boundaries, and as illustrated at step 314, the recording head is positioned to test track N 502 that was selected at step 304. The on-track positioning depicted at step 314 is in preparation for the writing of an on-track data pattern A 514 (step 316) and an off-track data pattern Y 516 (step 318). Different pre-determined data patterns are utilized in order to differentiate the on-track from the off-track data fields.

The off-track data pattern Y 516 overlays a portion of on-track data pattern A 514 such that when the recording head is returned to track center 508, as depicted at step 320, on-track data pattern A 514 cannot be read. Proceeding to step 322 wherein is illustrated the displacement of the recording head by a distance Δx from track center 508. The recording head is activated to perform a read operation at Δx (step 324) and, as depicted at inquiry step 326, the result of the read operation is assessed to determine whether the on-track data pattern A 514 has been read. If so, the total distance 512 from which the recording head has been displaced from track center 508 is utilized to designate the off-track threshold (step 328) and, after the off-track threshold is recorded on a reserved disk area, the process stops (step 330). If the on-track field is not detected, the process returns to step 322. Steps 322 through 330 are performed on each opposing side of the track center 508 and Δx is the increment in both directions. The off-track recovery threshold determination procedure shown in FIG. 3 is repeated for every recording head within a given drive.

Figure 4:
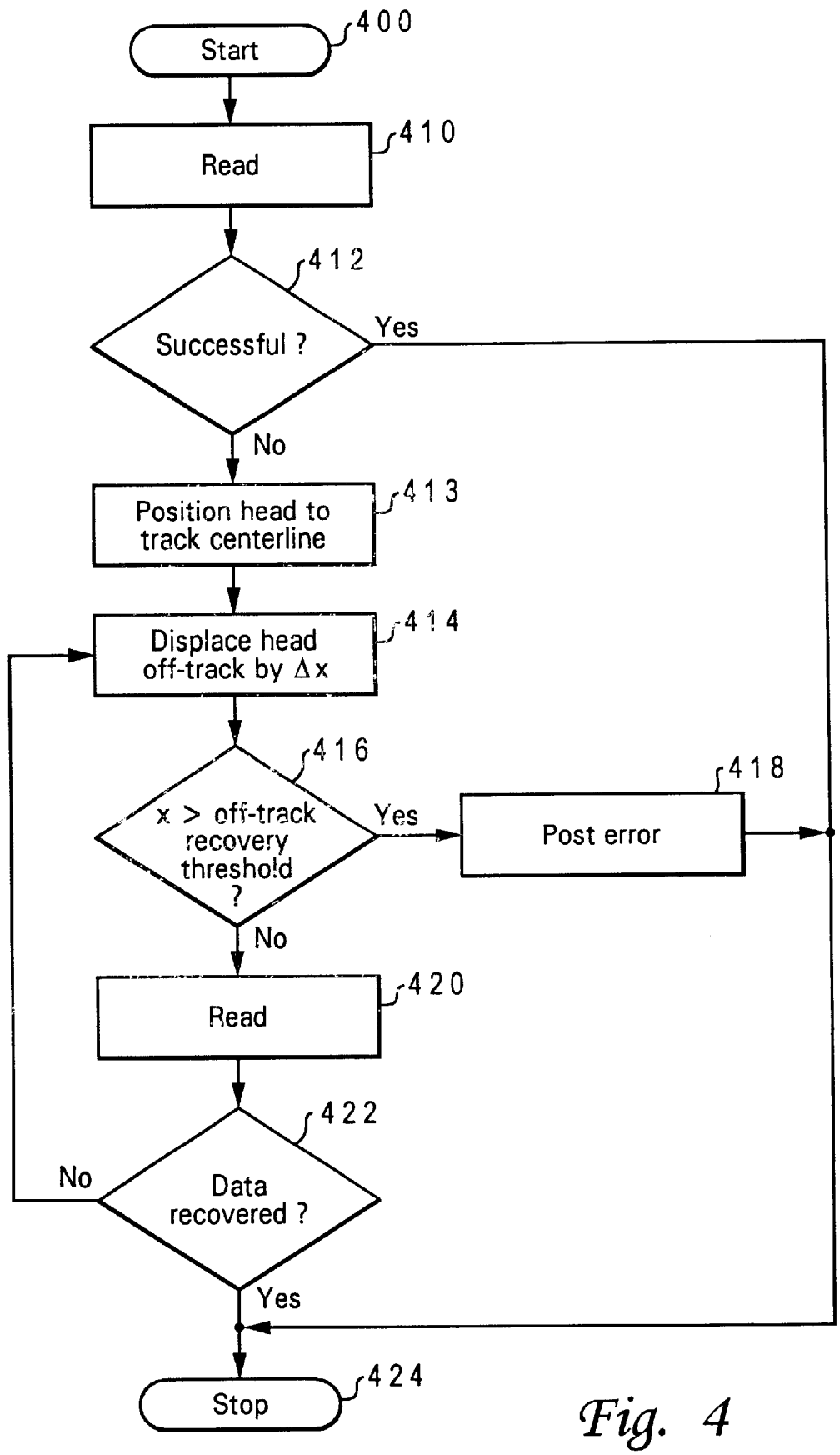
FIG. 4 is a high-level logic diagram depicting an off-track recovery procedure in accordance with the preferred embodiment depicted in FIGS. 1, 2, and 3.

Turning now to FIG. 4 there is illustrated a high-level logic diagram depicting an off-track recovery procedure performed within HDD system 100. The off-track recovery procedure commences as depicted at steps 400 and 410 which illustrate a read operation performed by HDA 102. As part of read operation depicted at step 410, the recording head is positioned on-track (at track centerline). If, as shown at steps 412 and 424, data read-write and servo-sensing module 284 senses a successful data read operation with ECC on-the-fly "ON", the on-track read operation terminates successfully. If the on-track read fails, a data recovery procedure (DRP) in accordance with the method and system of the present invention is commenced. Other recovery methods like re-read, channel filter adjustment, ECC power variation, and the like are not discussed herein.

As illustrated at step 414, this DRP commences with the recording head being displaced by an incremental distance, $\Delta x$, from the on-track position at which off-set, $x=n\Delta x$, is equal to zero (n=0). It should be noted that $\Delta x$ refers to the incremental displacement by which the head is skewed from the track centerline in either opposing direction. Next, as shown at inquiry step 416 a determination is made whether the total off-set, x, is greater than the recovery threshold distance determined as depicted in FIG. 3. If so, an error is posted (step 418) and the process ends at step 424. If the current displacement, x, is within the allowable displacement threshold, a read operation is performed at step 420. It should be noted that the off-track recovery method depicted in FIG. 4 ensures the integrity of the data read at step 420. If however, the data read at step 420 is unsuccessful (step 422) the incremental off-track recovery procedure illustrated by steps 414 though 422 is repeated until either the data is recovered or the allowable displacement threshold is reached.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is it convenient to describe the invention in terms of instructions, symbols, characters, or the like, the reader should remember that all of these and similar terms should be associated with the appropriate physical elements. Thus, a method for implementing the steps described in association with FIGS. 3 and 4 can be accomplished with a computer-aided device. In such a method, data stored in a memory unit of a data-processing system such as a data-processing system, can represent steps in a method for implementing a preferred embodiment of the present invention.

What is claimed is:

1. A method for adaptively limiting an off-track recovery displacement of a recording head during an off-track data recovery operation within a head disk assembly (HDA), wherein said HDA includes an actuator that positions said recording head in accordance with an actuator control signal, said method comprising the steps of:
    anticipating an allowable off-track recovery displacement threshold of said recording head; and
    responsive to a failed read operation, commencing an off-track data recovery procedure, wherein said data recovery procedure includes calibrating said actuator control signal in accordance with the anticipated off-track displacement threshold, said calibrated actuator control signal utilized to control the positioning of said recording head during off-track data recovery.

2. The method of claim 1, wherein said anticipating step comprises the steps of:
    performing an off-track displacement test within said HDA to determine said off-track recovery displacement threshold; and
    recording said off-track recovery displacement threshold, such that said off-track recovery displacement threshold is accessible for calibrating said actuator control signal.

3. The method of claim 2, wherein said step of performing an off-track displacement test further comprises the steps of:
    positioning said recording head to an on-track position centered with respect to a test track in accordance with a pre-determined on-track positioning signal;
    writing an on-track test data field at the on-track position;
    moving said recording head to an off-track position within said test track, wherein said off-track position is offset from the on-track position in accordance with a pre-determined off-track a positioning signal;
    writing an off-track test data field at the off-track position such that said off-track test data field overwrites a portion of said on-track test data field;
    repositioning said recording head to the on-track position;
    performing stepwise read operations at incremental, radially off-set positions with respect to the on-track position until said on-track test data field is read; and
    identifying the distance between said on-track position and the radially off-set position at which said on-track test data field is read as said off-track recovery displacement threshold.

4. The method of claim 1, wherein said HDA further includes a data track on which a data field resides, said method further comprising the steps of:
    performing a read operation within said HDA, and as part of said performing said read operation, positioning said recording head on-track within said data track; and
    as part of said off-track data recovery procedure:
        positioning said recording head at a first offset position from the center of said data track;
        attempting to read said data field at said first offset position;
        delivering data read from said data field to a host system in response to a successful data read attempt at said first offset position; and
        repositioning said recording head to a further removed offset position from the center of said data track in response to a failed data read attempt at said first offset position.

5. The method of claim 4, farther including the step of limiting off-track recovery displacement of said recording head in accordance with said off-track recovery displacement threshold.

6. A hard disk drive (HDD) capable of adaptively limiting an off-track recovery displacement of a recording head during an off-track data recovery operation, said HDD comprising:
    an actuator controller producing an actuator control signal;
    an actuator that positions said recording head in accordance with said actuator control signal;
    an off-track recovery data table containing an off-track recovery displacement threshold of said recording head; and a controller responsive to a failed read operation, for commencing an off-track data recovery procedure, wherein said data recovery procedure includes calibrating said actuator control signal in accordance with the off-track recovery displacement threshold retrieved from said off-track recovery data table, said calibrated actuator control signal utilized to control the positioning of said recording head during off-track data recovery.

7. The HDD of claim 6, further comprising:

means for determining the off-track recovery displacement threshold in accordance with an off-track displacement test.

8. The HDD of claim 7, wherein said means for determining said off-track recovery displacement threshold comprises:

a test track;

means for positioning said recording head to an on-track position within said centered with respect to said test track in accordance with a pre determined on-track positioning signal;

means for writing an on-track test data field at the on-track position;

means for moving said recording head to an off-track position within said test track, wherein said off-track position is offset from the on-track position in accordance with a predetermined off-track positioning signal;

means for writing an off-track test data field at the off-track position such that said off-track test data field overwrites a portion of said on-track test data field;

means for repositioning said recording head to the on-track position in accordance with a reset signal;

means for performing stepwise read operations in accordance with a pre-determined off-track test signal at incremental, radially off-set positions with respect to the on-track position until said on-track test data field is read; and means for identify the distance between said on-track position and the off-set positioning at which said on-track test data field is read as said off-track recovery displacement threshold.

9. The HDD of claim 6, wherein said controller further comprises:

means for positioning said recording head at a first offset position from the center of said data track;

means for attempting to read a data field at said first offset position;

means for delivering data read from said data field to a host system in response to a successful data read attempt at said first offset position; and means for repositioning said recording head to a further removed offset position from the center of said data track in response to a failed read attempt at said first offset position.

10. The HDD of claim 9, flintier comprising means for limiting off-track displacement of said recording head in accordance with said off-track recovery displacement threshold.

11. A method for adaptively limiting an off-track recovery displacement of a recording head during an off-track data recovery operation within a head disk assembly (IDA), wherein said HDA includes an actuator that positions said recording head in accordance with an actuator control signal, said method comprising the steps of:

anticipating an allowable off-track recovery displacement threshold of said recording head, said anticipating an allowable off-track recovery displacement threshold comprising performing an off-track displacement test including:

positioning said recording head to anion-track position centered with respect to a test track in accordance with a pre-determined on-track positioning signal;

writing an on-track test data field at the on-track position;

moving said recording head to an off-track position within said test track, wherein said off-track position is offset from the on-track position in accordance with a pre-determined off-track positioning signal;

writing an off-track test data field at the off-track position such that said off-track test data field overwrites a portion of said on-track test data field;

repositioning said recording head to the on-track position;

performing stepwise read operations at incremental, radially off-set positions with respect to the on-track position until said on-track test data field is read; and identifying the distance between said on-track position and the radially off-set position at which said on-track test data field is read as said off-track recovery displacement threshold; and responsive to a failed read operation, commencing an off-track data recovery procedure, wherein said data recovery procedure includes calibrating said actuator control signal in accordance with the anticipated off-track displacement threshold, said calibrated actuator control signal utilized to control the positioning of said recording head during off-tack data recovery.

12. The method of claim 11, wherein said anticipating step comprises the step of:

recording said off-track recovery displacement threshold, such that said off-track recovery displacement threshold is accessible for calibrating said actuator control signal.

13. The method of claim 11, wherein said HDA further includes a data track on which a data field resides, said method further comprising the steps of:

performing a read option within said DA, and as part of said performing said read operation, positioning said recording head on-track within said data track; and as part of said off-track data recovery procedure:

positioning said recording head at a first offset position from the center of said data track;

attempting to read said data field at said first offset position;

delivering data read from said data field to a host system in response to a successful data read attempt at said first offset position; and repositioning said recording head to a further removed offset position from the center of said data track in response to a failed data read attempt at said first offset position.

14. A system for adaptively limiting an off-track recovery displacement of a recording head during an off-track data recovery operation within a head disk assembly (HDA), wherein said HDA includes an actuator that positions said recording head in accordance with an actuator control signal said system comprising:

means for anticipating an allowable off-track recovery displacement threshold of said recording head, said anticipating an allowable off-track recovery displacement threshold comprising performing an off-track displacement test including:

positioning said recording head to an on-track position centered with respect to a test track in accordance with a predetermined on-track positioning signal;

writing an on-track test data field at the on-track position;

moving said recording head to an off-track position within said test track, wherein said off-track position is offset from the on-track position in accordance with a pre-determined off-track positioning signal;

writing an off-track test data field at the off-track position such that said off-track test data field overwrites a portion of said on-track test data field;

repositioning said recording head to the on-track position;

performing stepwise read operations at incremental, radially off-set positions with respect to the on-track position until said on-track test data field is read; and identifying the distance between said on-track position and the radially off-set position at which said on-track test data field is read as said off-track recovery displacement threshold; and means responsive to a failed read operation, for commencing an off-track data recovery procedure, wherein said data recovery procedure includes calibrating said actuator control signal in accordance with the anticipated off-track displacement threshold, said calibrated actuator control signal utilized to control the positioning of said recording head during off-track data recovery.

15. The system of claim 14, further comprising means for recording said off-track recovery displacement threshold, such that said off-track recovery displacement threshold is accessible for calibrating said actuator control signal.

16. The system of claim 14, wherein said HDA further includes a data track on which a data field resides, said system further comprising:

means for performing a read operation within said HDA, including means for positioning said recording head on-track within said data track; and as part of said means responsive to a failed read operation, for commencing an off-track data recovery procedure:

means for positioning said recording head at a first offset position from the center of said data track;

means for attempting to read said data field at said first offset position;

means for delivering data read from said data field to a host system in response to a successful data read attempt at said first offset position; and means for repositioning said recording head to a further removed offset position from the center of said data track in response to a failed data read attempt at said first offset position.

* * * * *

UNITED STATES PATENT AND TRADEMARK OFFICE
CERTIFICATE OF CORRECTION

PATENT NO.     : 6,643,084 B1
DATED          : November 4, 2003
INVENTOR(S)    : Andrew et al.

It is certified that error appears in the above-identified patent and that said Letters Patent is hereby corrected as shown below:

Column 8,
Line 22, delete "a" before the word "positioning".

Column 9,
Line 40, delete "identify" and replace with -- identifying --.
Line 41, delete "positioning" and replace with -- position --.
Line 64, delete "(IDA)" and replace with -- (HDA) --.

Column 10,
Line 6, delete "anion-track" and replace with -- an on-track --.
Line 44, delete "DA" and replace with -- HDA --.

Signed and Sealed this

Thirtieth Day of December, 2003

JAMES E. ROGAN
*Director of the United States Patent and Trademark Office*